United States Patent [19]

Skerlos et al.

[11] Patent Number: 4,633,297

[45] Date of Patent: Dec. 30, 1986

[54] TELEVISION RECEIVER HAVING TELETEXT PROCESSOR WITH ROM FOR ON-SCREEN MESSAGE

[75] Inventors: Peter C. Skerlos, Arlington Heights; Thomas J. Zato, Palatine; Gary A. Jones, Arlington Heights, all of Ill.

[73] Assignee: Zenith Electronics Corporation, Glenview, Ill.

[21] Appl. No.: 718,572

[22] Filed: Apr. 1, 1985

[51] Int. Cl.$^4$ .............................................. H04N 9/00
[52] U.S. Cl. ..................................... 358/22; 358/147; 358/183
[58] Field of Search ...................... 358/22, 147, 183, 1

[56] References Cited

U.S. PATENT DOCUMENTS

| | | | |
|---|---|---|---|
| 4,338,624 | 7/1982 | d'Hautecourt et al. | 358/22 |
| 4,344,090 | 8/1982 | Belisomi et al. | 358/22 |
| 4,459,585 | 7/1984 | Pasternak | 358/183 |

FOREIGN PATENT DOCUMENTS 2033692  5/1980  United Kingdom .................. 358/22

*Primary Examiner*—John W. Shepperd

[57] ABSTRACT

A microprocessor based TV/TTX processor includes a stored pages ROM in the TTX processor for storing on-screen display messages and lists of functions and characteristics as pages of TTX data. An RGB switch is coupled to receive the output of a character generator in the TTX processor and to receive the video output of the TV for selectively displaying information from each source with or without the on-screen messages and lists. The stored pages ROM relieves the microprocessor of the necessity of generating the on-screen messages and lists. Items on the list are controllable by the viewer and an indication of the status of the item is given by the microprocessor changing a character in the display memory of the TTX processor.

10 Claims, 4 Drawing Figures

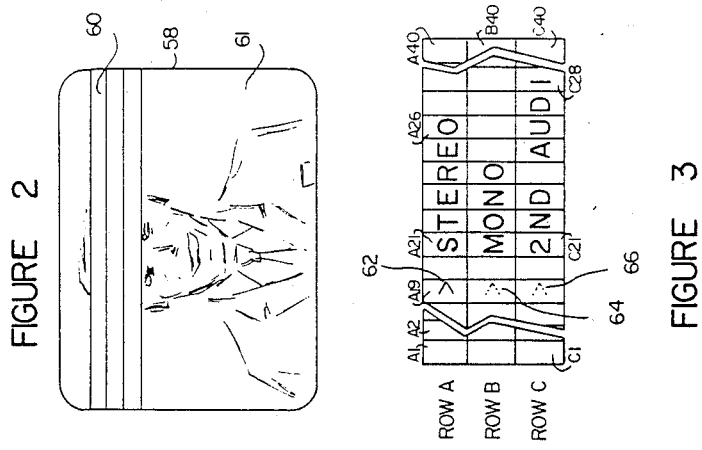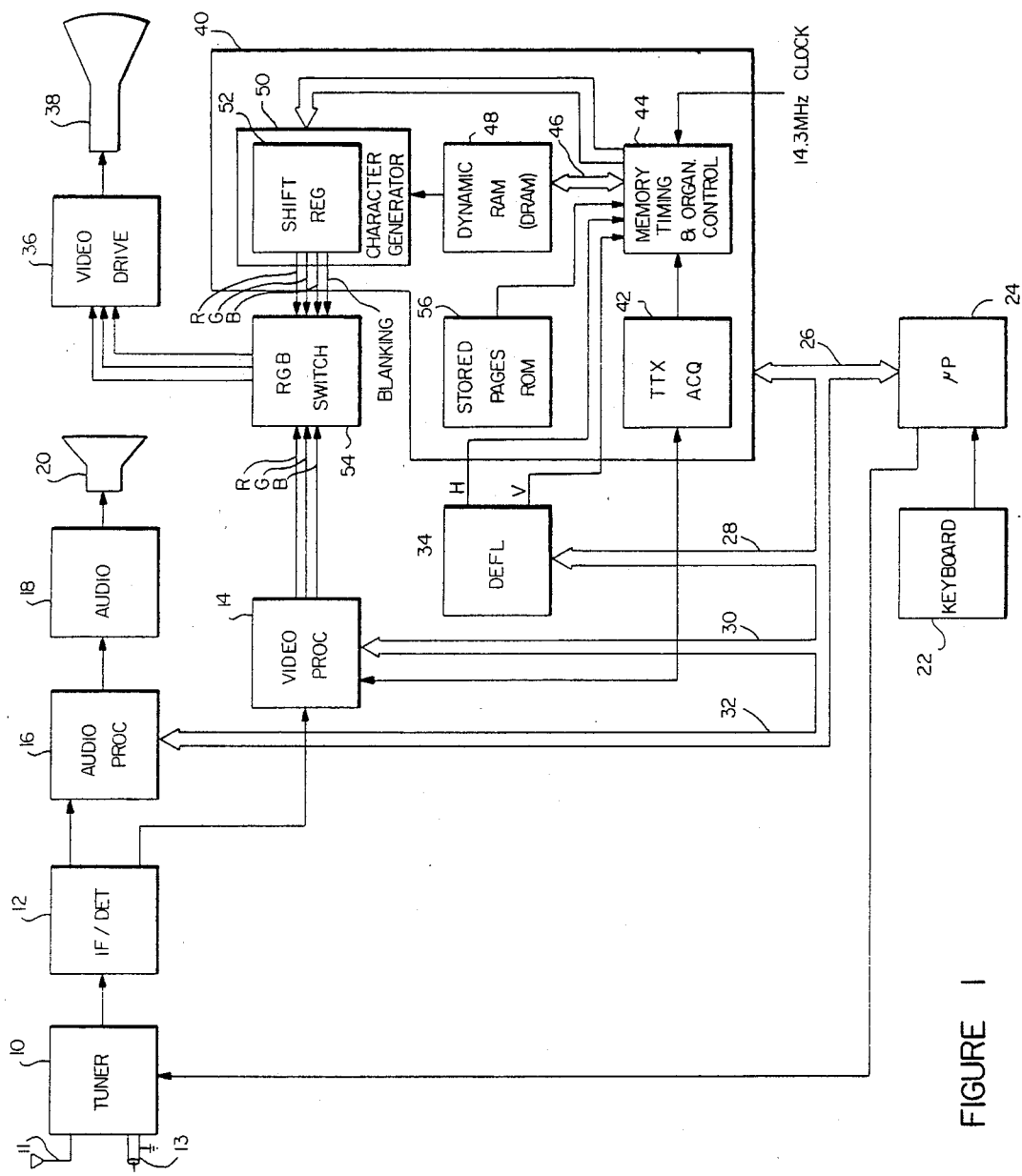

TELEVISION RECEIVER HAVING TELETEXT PROCESSOR WITH ROM FOR ON-SCREEN MESSAGE

CROSS REFERENCE TO RELATED PATENT APPLICATIONS

This application is related to application Ser. No. 759,550 entitled "Video System With Television Receiver and Teletext Processor Capable of Switching External RGB Signals", in the name of Thomas J. Zato filed of even data herewith and assigned to Zenith Electronics Corporation, which application is hereby incorporated by reference.

BACKGROUND OF THE INVENTION AND PRIOR ART

This invention relates in general to video systems and, in particular, to video systems including a Teletext (TTX) processor and a television receiver including an on-screen display capability.

There is a growing trend in more expensive television receivers (TVs) toward replacing conventional switches that activate and control certain TV functions with microprocessor control means that are responsive to viewer initiated commands received from a keyboard, that may be either on the TV or remotely located. Such receivers may include "on-screen" displays to apprise the viewer of the functions and of their status. Thus, special features, such as automatic telephone dialing and selection of signal sources, as well as conventional features, such as control of channel and volume and control of color, tint and brightness of the picture may be implmented in a microprocessor based TV. Generally the function and features to be controlled and their status are selectable by the viewer and displayed on a portion of the TV screen. A very common form of on-screen display briefly indicates the channel number to which the TV is tuned and the time of day when the TV is turned on or when a channel change is made. The display may also be actuated when the viewer operates a special key on the keyboard.

Another service that is growing in popularity is that known as Teletext (TTX) wherein alphanumeric and graphic displays are transmitted on certain lines of the vertical blanking intervals of a conventional television signal. The transmitted information is digitally encoded and not visible to a viewer without a special TTX processor. The encoded information is acquired by the processor and stored in a dynamic random access memory (DRAM) that is coupled to a character generator which provides the appropriate video output signals for displaying a selected TTX "page" on th TV screen. Each TTX page consists of 40 characters across and 24 rows of characters down. TTX systems are well known in the art and reference may be had to U.S. Pat. No. 4,393,404 for a data acquisition circuit that is responsive to viewer commands for acquiring a selected page or pages of the recycling TTX information and for storing the 40×24 character array of digitally encoded data comprising each page. This stored, encoded data is applied to a display generator which decodes the stored information for synthesizing R, G and B character signals which drive the cathode ray tube (CRT) of the TV for producing a display reflecting the stored data. The display thus comprises a page of 24 rows of text or graphics, with each row consisting of up to 40 characters.

In television receivers having on-screen message display capability, the microprocessor control unit is assigned the task of generating the characters for producing the on-screen display. The microprocessor also performs many other functions, such as tuning, audio adjustment, color control and production of timing signals in addition to generating the on-screen messages. The invention enables a significant simplification in the microprocessor software by delegating the generation of at least some of the on-screen messages to the TTX processor. This is accomplished by incorporating the messages in a read only memory (ROM) that is addressable by the microprocessor as pages of TTX data.

OBJECTS OF THE INVENTION

A principal object of the invention is to provide a novel video system.

Another object of the invention is to provide a more efficient microprocessor based TV/TTX processor with on-screen message capability.

A further object of the invention is to provid a microprocessor based TV/TTX processor with viewer controllable on-screen messages stored in ROM in the TTX processor.

An additional object of the invention is to provide a TTX processor having a display memory for storing a list of control functions with which the viewer can interact.

BRIEF DESCRIPTION OF THE DRAWINGS

Other objects and advantages of the invention will be apparent upon reading the following description in conjunction with the drawings in which:

FIG. 1 is a block diagram of the system of the invention;

FIG. 2 is a depiction of the viewing screen of a TV with an on-screen display;

FIG. 3 is an enlargement of a portion of the on-screen display of FIG. 2; and

DESCRIPTION OF THE PREFERRED EMBODIMENT

Figure 4:
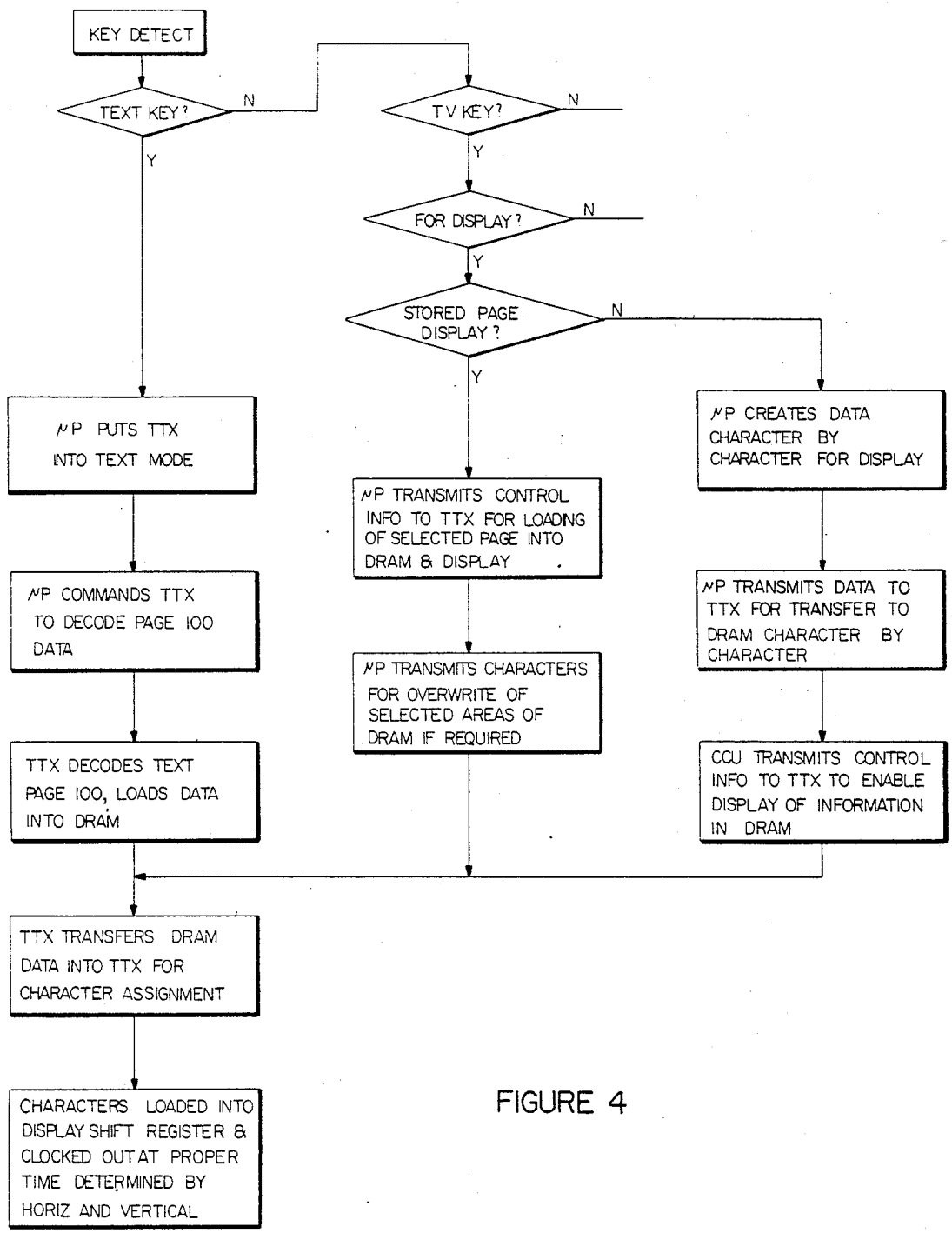
FIG. 4 is a flow chart useful in programming the microprocessor of the inventive system.

FIG. 1 represents a microprocessor based TV with a TTX processor and includes a tuner 10, having an antenna input 11 and a cable input 13, that is coupled to an IF/Detector 12 which, in turn, supplies a video processor 14 and an audio processor 16. The output of auido processor 16 is supplied to an audio output drive circuit 18, the output of which drives a conventional loudspeaker 20. Those skilled in the art will recognize that audio processor 16, audio circuit 18 and loudspeaker 20 may be capable of processing stereophonic auido signals, or a second language auido signal in accordance with conventional technology.

A viewer operated keyboard 22 is coupled to a microprocessor controller 24 that, in turn, is coupled to tuner 10 and to a two-way communication bus 26 linked to a TTX processor 40. Communication bus 26 has branches 28, 30 and 32 linked respectively to a deflection circuit 34, a video processor 14 and to audio processor 16. It will be appreciated that the depiction of two-way communication buses indicates that communication can occur in both directions over the bus such that the microprocessor can "talk to" each of the units to which it is linked and each unit, in turn, can "talk to" the microprocessor.

Deflection circuit 34 supplies conventional horizontal and vertical timing signals to TTX processor 40. Video processor 14 derives RGB signals from the video signal output of IF/DET 12 and supplies RGB signals to an RGB switch 54. If/Detector 12 supplies a conventional basebond TV signal to video processor 14 which in turn supplies the basebond TV signal to a TTX acquisition circuit 42 in TTX processor 40 that, in turn, is coupled to a block 44 labelled Memory Timing, Ortganization and Control. Block 44 is linked by a two-way communication bus 46 to a DRAM 48. Block 44 is also connected to a character generator 50. The character generator includes a shift register 52 having RGB and blanking outputs that are coupled to RGB switch 54. The output of RGB switch 54 is coupled to a video drive circuit 36 that, in turn, supplies appropriate RGB signals to a color CRT 38. DRAM 48 is coupled to character generator 50 and to a stored pages ROM 56 through Memory Timing, Organization and Control Circuit 44. Memory Timing, Organization and Control Circuit 44 is driven by an external 14.3 MHz clock.

The functioning of TTX processor 40 is well known in the art. The information in stored pages ROM 56 comprises digitally encoded messages for on-screen display. The messages are encoded in the same format as TTX data so that when accessed by microprocessor 24 they may be loaded into DRAM 48 as any other TTX data.

RGB switch 54, which is activated by the presence of a blanking signal from shift register 52, selectively applies the RGB signals from video processor 14 and from shift register 52 to video drive circuit 36 for dispaly on CRT 38. When the video system is operated in a conventional television mode, RGB signals are derived from the teletext data supplied from video processor 14 only. When operated in a conventional TTX mode, RGB signals, derived from the TTX data are supplied from shift register 52. For an on-screen display or list of functions or items in either mode, signals from TTX processor 40 and from video processor 14 are mixed or "overlaid" with the message or list selected by the viewer from stored pages ROM 56.

Thus, the on-screen display may be a message or may take the form of a list of items prompting the viewer to make a choice, such as a video system function selection, source connection, etc. The inventive arrangement also provides feedback to the viewer of the results of his selection by altering one or more of the characters in the DRAM to yield an indication of the viewer selection. The indication can take many forms such as change of color in the display or listed item, adding a character, such as a caret to a listed item, by overwriting a control character in the DRAM, by underlining the listed item, etc.

In a microprocessor based television receiver, the microprocessor is "busy" with its many tasks and functions. The provision of a stored pages ROM for on-screen messages and display of control functions, etc. relieves the microprocessor of the burden of directly controlling the generation of the messages or display. With the arrangement of the invention, the microprocessor may simply send a command to the TTX processor to "call up" an appropriate page or pages in stored pages ROM 56 for loading into DRAM 48. The microprocessor is thus made available to perform its other tasks and functions while the TTX processor generates the messages.

In FIG. 2 an on-screen message or display 60 is shown overlaid on a video presentation 61 on the screen 58 of the CRT. The size and position of the message is a matter of choice. While it need not extend across the entire screen, the software and programming is significantly simplified by utilizing the conventional width of the TTX page irrespective of the actual width of the on-screen message or list. The height of the display is similarly a matter of choice.

In FIG. 3 an enlarged portion of a typical on-screen auido mode selection item list is shown. Three rows, labelled A, B and C, of the 24 rows of a TTX page are used to make up the on-screen list. Each row consists of 40 characters identified as character positions A1–A40, B1–B40 and C1–C40. The list consists of the words STEREO in row A, MONO in row B and 2nd AUDIO in row C. The word STEREO is madeup of characters in position A21–A26, the word MONO by characters in positions B21–B24 and the words 2nd AUDIO by characters in positions C21–C29. In character position 19 in each row a caret may be written in response to viewer selection of that item on the list. A caret 62 is shown in row A with carets 64 and 66 in rows B and C, respectively, being illustrated in dotted lines. If the viewer selected the MONO audio mode, for example, the selection would be indicated by the microprocessor overwriting, in the DRAM, a caret 64 in character position B19. Thus, the selection is communicated to the viewer. The selection may also be indicated by encoding the appropriate character positions with commands for generating the characters in the item list in color, or for underlining them or by other appropriate means, depending upon the capabilities of the character generator system, to convey to the viewer the results of his selection. Thus, not only does the invention provide more effective utilization of the microprocessor in the TV, TTX video system, it also provides for a viewer-interactive item list or message display.

Reference to the flow chart of FIG. 4 may be had to assist in the programming of the microprocessor to carry out the invention as described.

Responsive to a key detection, a determination is made as to whether a TTX key is depressed. If it is a TTX key, the microprocessor puts the TTX processor into the text mode and commands it to decode page 100 of the TTX data. The TTX processor decodes and loads that data into the DRAM. The TTX processor then transfers the DRAM data to the character generator and the character information is moved into the shift register and clocked out at the proper time under control of the horizontal and vertical signals. If a TTX key is not depressed, the determination is made as to whether a TV key is depressed, and if so, if a display is required and if that display is in the stored pages ROM. If it is, the microprocessor sends control information to the TTX processor for loading the selected page into DRAM and for its display, as before. The microprocessor then transmits characters for overwriting the selected areas of DRAM if required. If the desired display is not in the stored pages ROM the microprocessor creates the data, character by character, and transmits it to the TTX processor for transfer to the DRAM and also transmits the control information to enable display of the information in the DRAM.

What has been described is a novel video processing system. It is recognized that numerous modifications and changes in the described embodiment of the invention will be apparent to those skilled in the art without departing from its true spirit and scope. The invention is to be limited only as defined in the claims.

What is claimed is:

1. A video system comprising:
   a TV including microprocessor control means for generating an on-screen message display command;
   a TTX processor including character generator means and dispay memory means for receiving, decoding and displaying TTX encoded data; and
   a ROM in said TTX processor for storing an on-screen message in TTX encoded form;
   whereby said encoded on-screen message may be loaded from said ROM to said display memory means for display as TTX data in response to the generation of said display command by said microprocessor control means.

2. The video system of claim 1 further including a video switch coupled to receive the output of said character generator means and to receive a video output of said TV, and wherein said message in said ROM includes less than a full TTX page of data, said microprocessor means controlling said video switch for mixing said on-screen message and the video output of said TV.

3. The video system of claim 2 further including a keyboard for enabling viewer control of the functions of said TV and said TTX processor and wherein said microprocessor control means are interactively connected to said display memory means for enabling overwriting of data therein.

4. In a microprocessor based TV of the type including microprocessor means for generating an on-screen message, a TTX processor including a character generator and a display memory for displaying TTX data, the improvement comprising:
   a ROM in said TTX processor accessible by said microprocessor means, said ROM storing an on-screen message in a TTX encoded format, said ROM being controllable by said microprocessor to load said on-screen message into said display memory for display in conjunction with said character generator.

5. A video system comprising:
   TV means including a viewing screen;
   TTX processor means including a dynamic display memory;
   microprocessor means for controlling functions and characteristics of said TV means and said TTX processor means;
   means enabling a viewer to interact with said microprocessor means;
   a ROM including a stored list of items related to said functions and characteristics encoded as TTX data; and
   means for loading the contents of said ROM into said display memory under control of said microprocessor means for displaying said list of items on said viewing screen, whereby said viewer may act with respect to a displayed item on said list.

6. The system of claim 5 wherein said microprocessor means controls said dynamic display memory responsive to interaction by said viewer for indicating to the viewer the results of his action with respect to said displayed item on said list.

7. The system of claim 6 wherein said TTX data comprising said list includes control codes associated with the items therein for indicating the status thereof to the viewer.

8. The system of claim 7 wherein the status of the items on said list is indicated by a change in color.

9. The system of claim 7 wherein the status of the items on said list is indicated by a visible character displayed adjacent to the item on said list.

10. A video system comprising:
    a TV including a viewing screen;
    a TTX processor including a DRAM;
    microprocessor means for controlling functions and characteristics of said TV and said TTX processor and for controlling said DRAM;
    means enabling a viewer to interact with said microprocessor means;
    a stored pages ROM including a list of items related to said functions and characteristics encoded as TTX data;
    means for loading the contents of said ROM into said DRAM under control of said microprocessor means for displaying said list on said viewing screen;
    said DRAM including microprocessor means controlled control codes associated with items on said list, for indicating the status of said items to said viewer whereby said viewer may act with respect to a displayed item on said list by interacting with said microprocessor means for changing said control codes.

* * * * *